(«12») United States Patent
Batla et al.

(10) Patent No.: US 9,311,820 B2
(45) Date of Patent: Apr. 12, 2016

(54) CONFIGURABILITY OPTIONS FOR INFORMATION, AIRSPACE, AND PROPERTY UTILIZED BY AN UNMANNED AERIAL VEHICLE PLATFORM

(71) Applicant: Verizon Patent and Licensing Inc., Arlington, VA (US)

(72) Inventors: Hani Batla, Teaneck, NJ (US); Ashok N. Srivastava, Mountain View, CA (US); Douglas M. Pasko, Bridgewater, NJ (US); Igor Kantor, Raleigh, NC (US); Gurpreet Ubhi, Nutley, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 66 days.

(21) Appl. No.: 14/282,237

(22) Filed: May 20, 2014

(65) Prior Publication Data

US 2015/0339933 A1    Nov. 26, 2015

(51) Int. Cl.
*G08G 5/00*    (2006.01)
(52) U.S. Cl.
CPC ............... *G08G 5/0069* (2013.01); *G08G 5/00* (2013.01); *G08G 5/003* (2013.01); *G08G 5/0004* (2013.01)
(58) Field of Classification Search
CPC . G08G 5/0013; G08G 5/0043; G08G 5/0082; G08G 5/0026; G08G 5/065

USPC .......................................................... 701/120
See application file for complete search history.

(56) References Cited

PUBLICATIONS

How et al., "Flight Demonstrations of Cooperative Control for UAV Teams", AIAA 3rd Unmanned Unlimited Technical Conference, Workshop and Exhibit, Sep. 20-23, 2004, 9 pages.*
Redding et al., "Distributed Multi-Agent Persistent Surveillance and Tracking with Health Management", American Institute Aeronautics and Astronautics, AIAA Guidance, Navigation, and Control Conference, 2011, 18 pages.
Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.

(Continued)

*Primary Examiner* — Maceeh Anwari

(57) ABSTRACT

A device receives aviation information associated with aviation in a geographical region, and receives configurability options associated with the aviation information. The device analyzes the aviation information based on the configurability options to generate analyzed information, and receives a request for a flight path for a UAV to travel from a first location to a second location in the geographical region. The device calculates the flight path from the first location to the second location based on the analyzed information and capability information associated with the UAV, and generates flight path instructions for the flight path. The device provides the flight path instructions to the UAV to permit the UAV to travel from the first location to the second location via the flight path.

20 Claims, 11 Drawing Sheets

(56) References Cited

PUBLICATIONS

Park et al., "Agent Technology for Coordinating UAV Target Tracking", Knowledge-Based Intelligent Information and Engineering Systems, Springer Berlin Heidelberg, 2005, 8 pages.

Kuwata et al., "Three Dimensional Receding Horizon Control for UAVs", AIAA Guidance, Navigation, and Control Conference and Exhibit, Aug. 16-19, 2004, 14 pages.

Alighanbari et al., "Filter-Embedded UAV Task Assignment Algorithms for Dynamic Environments", AIAA Guidance, Navigation, and Control Conference and Exhibit, Aug. 16-19, 2004, 15 pages.

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", http://web.mit.edu/people/lhow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optimization", Cambridge University Press, 2004, 730 pages.

\* cited by examiner

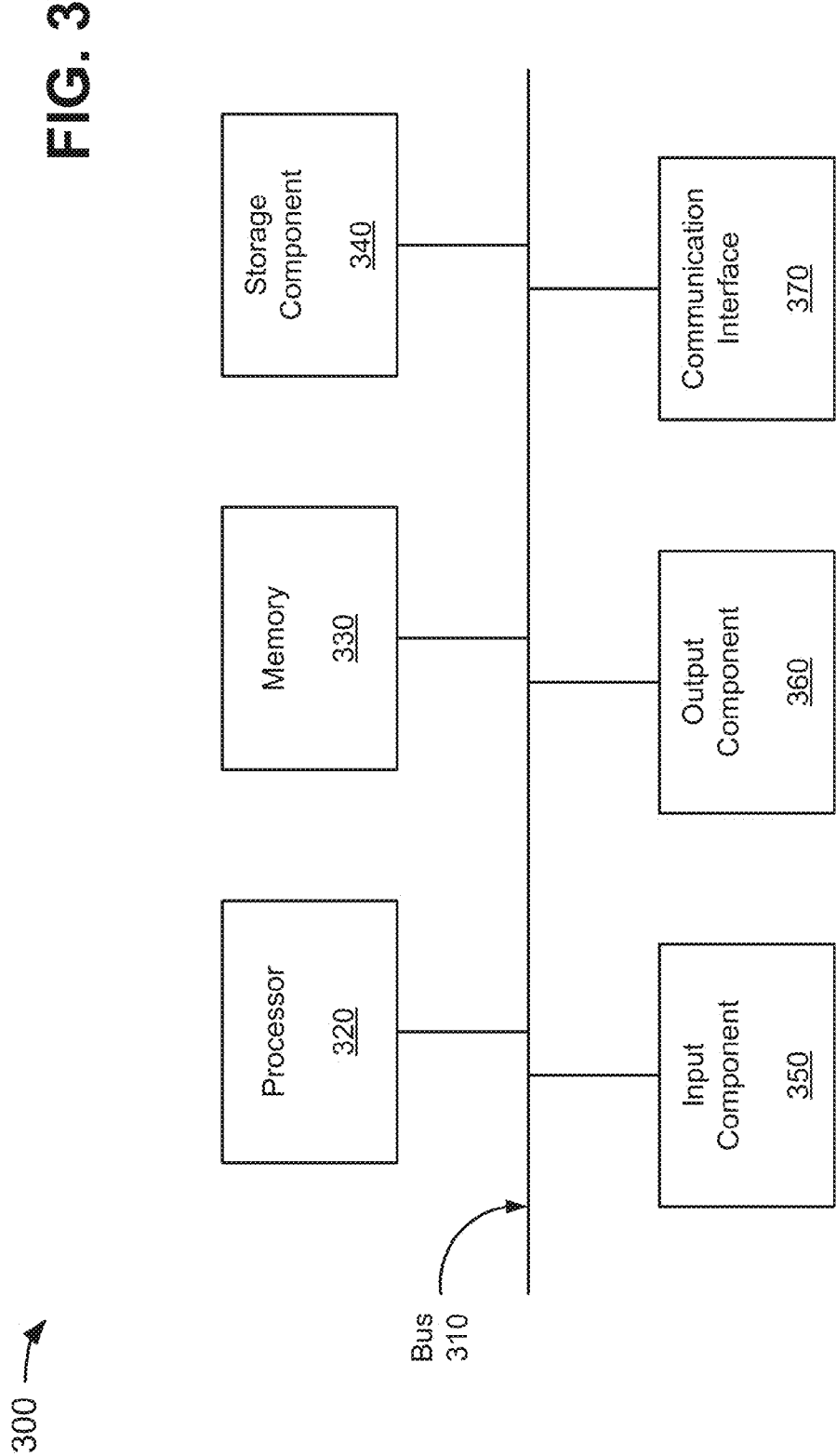

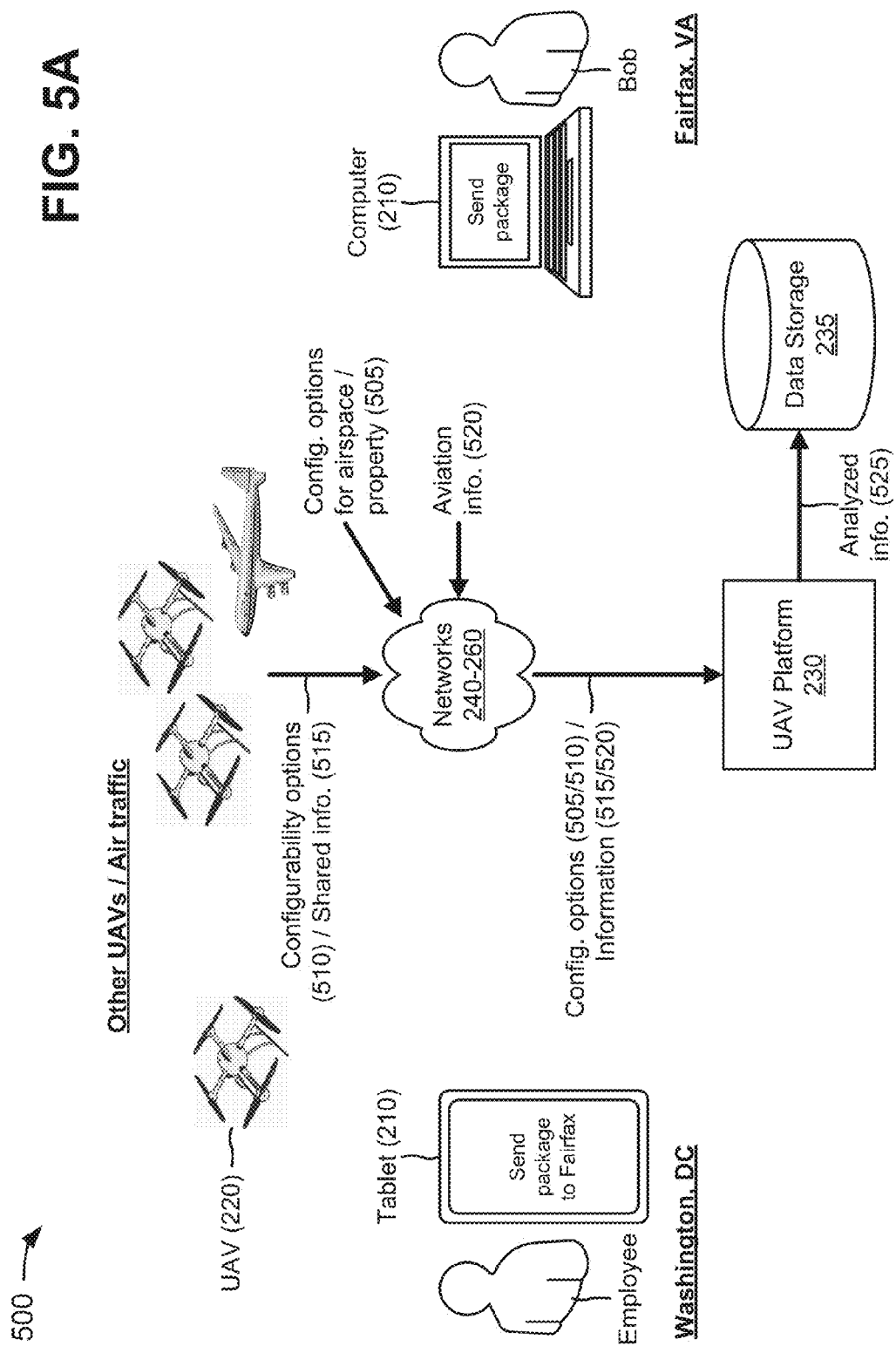

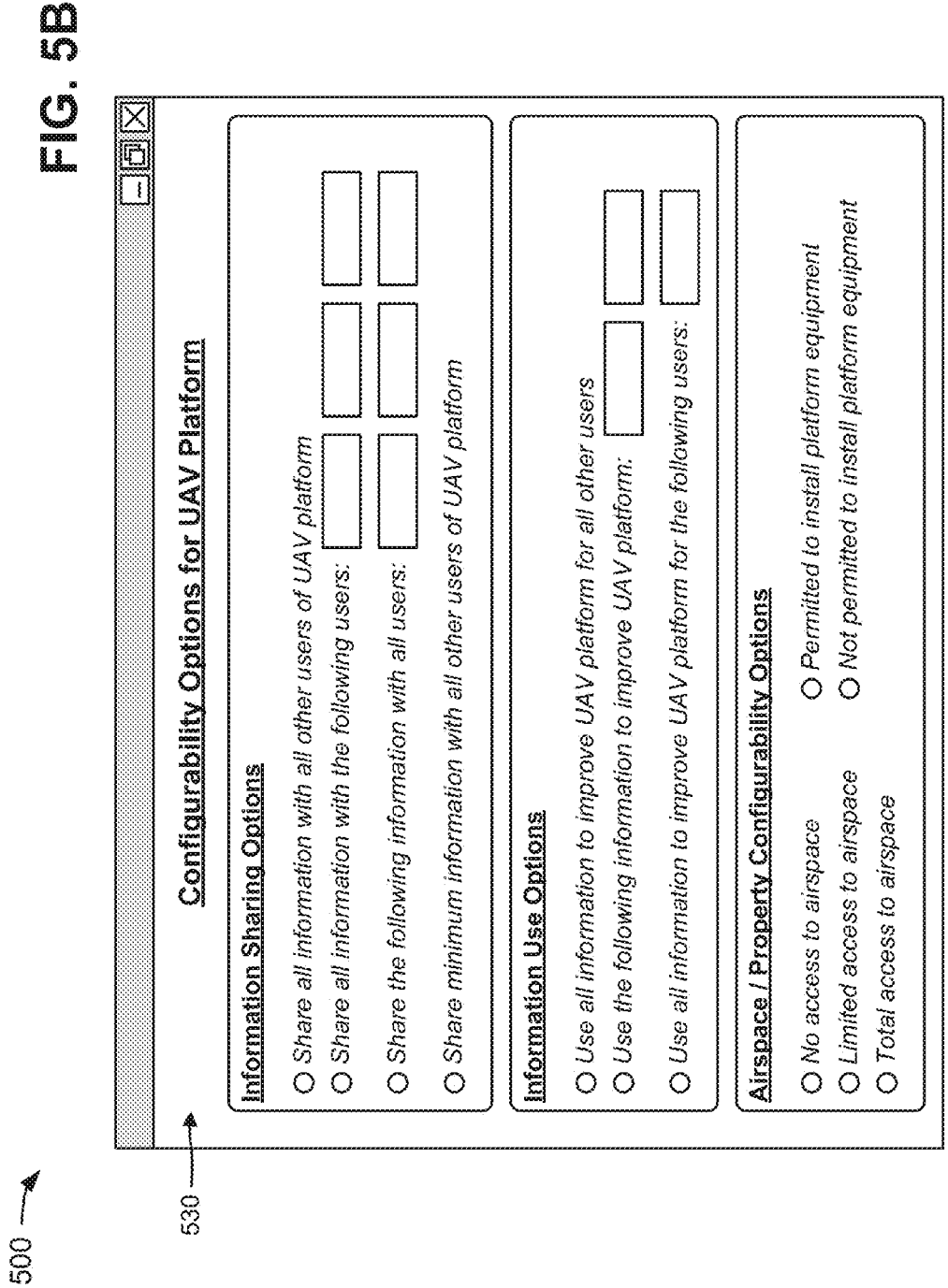

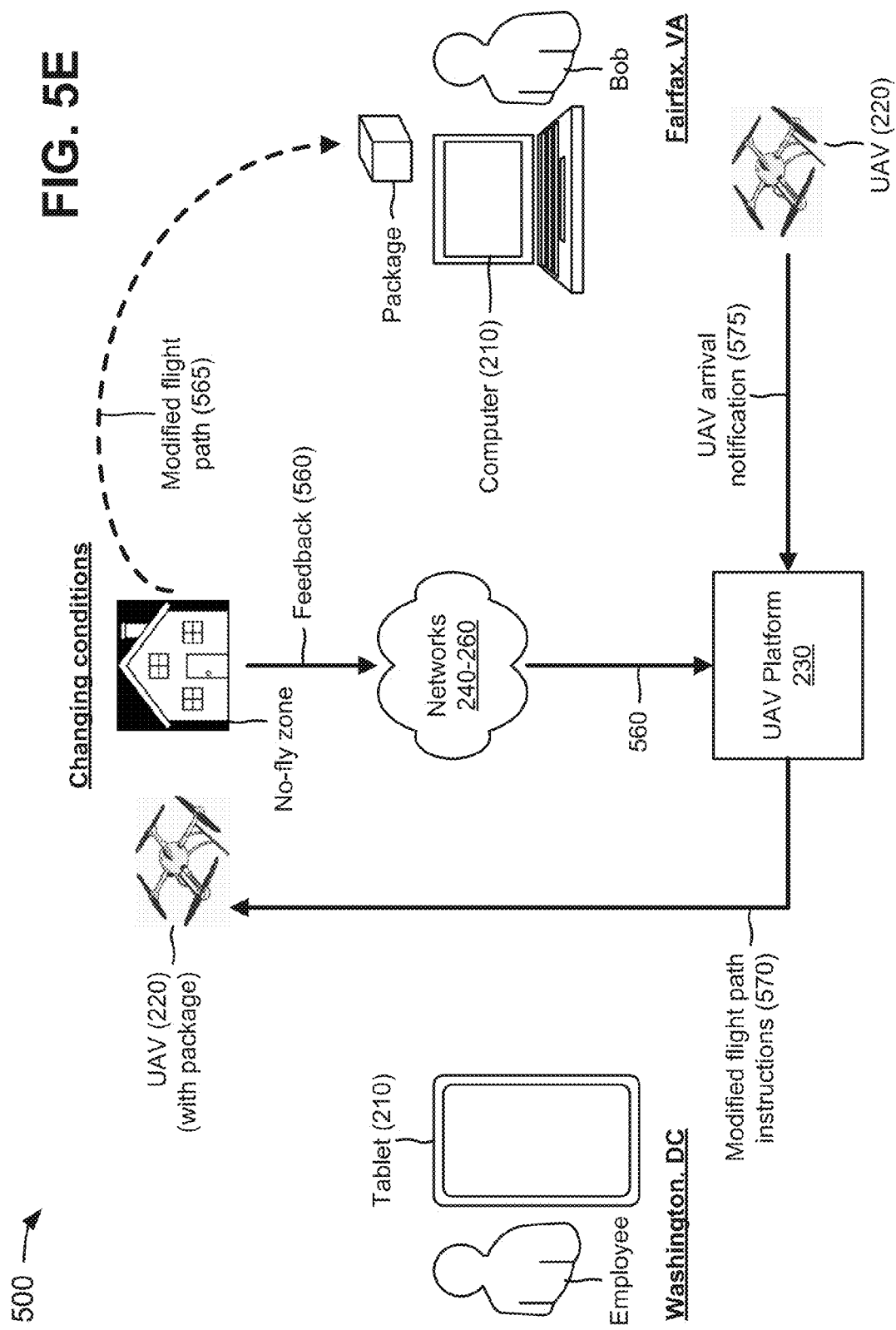

US 9,311,820 B2

CONFIGURABILITY OPTIONS FOR INFORMATION, AIRSPACE, AND PROPERTY UTILIZED BY AN UNMANNED AERIAL VEHICLE PLATFORM

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 3 is a diagram of example components of one or more devices of FIG. 2;

FIGS. 5A-5E are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
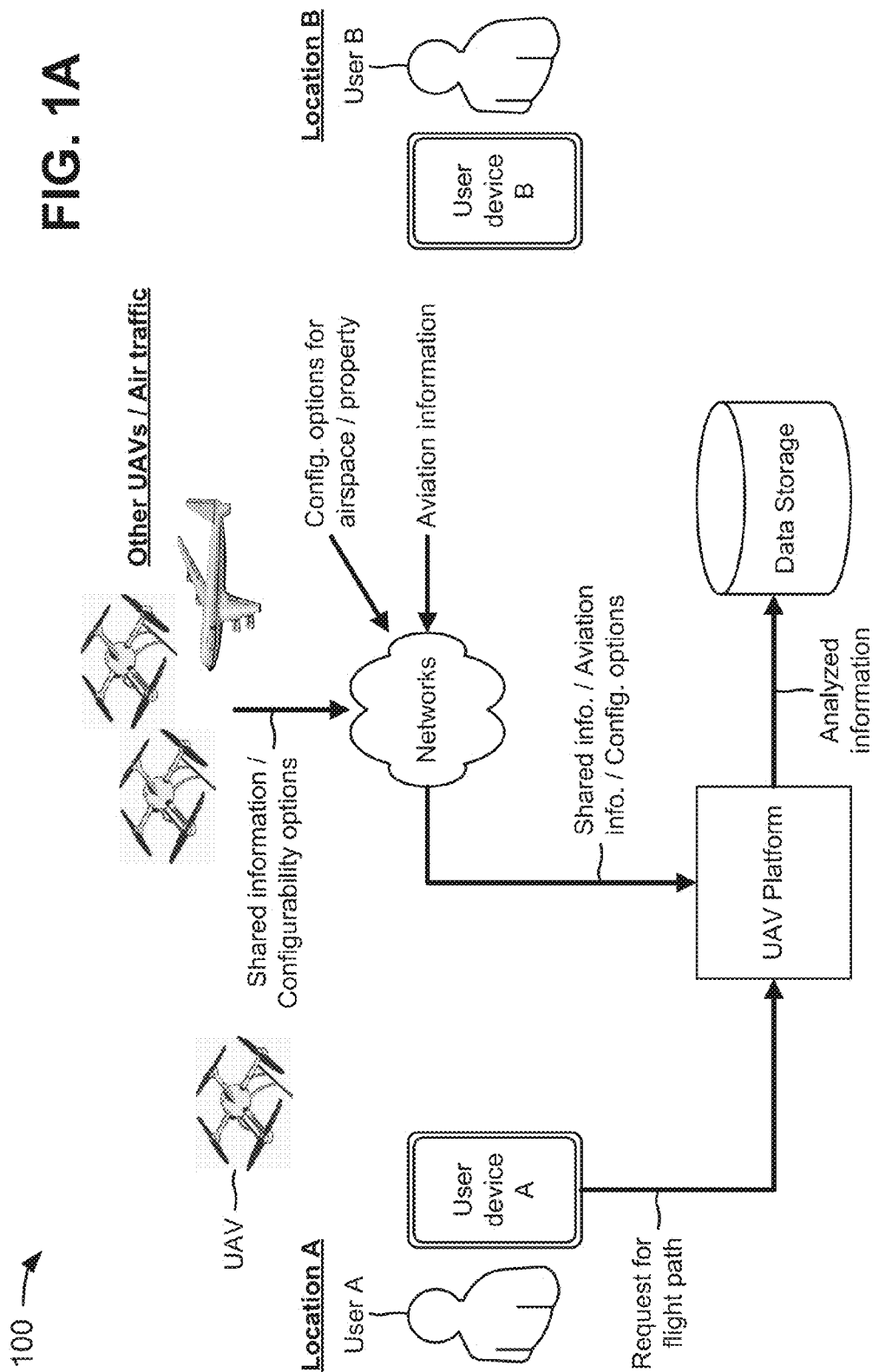
FIGS. 1A and 1B are diagrams of an overview of an example implementation described herein.
Figure 1B:
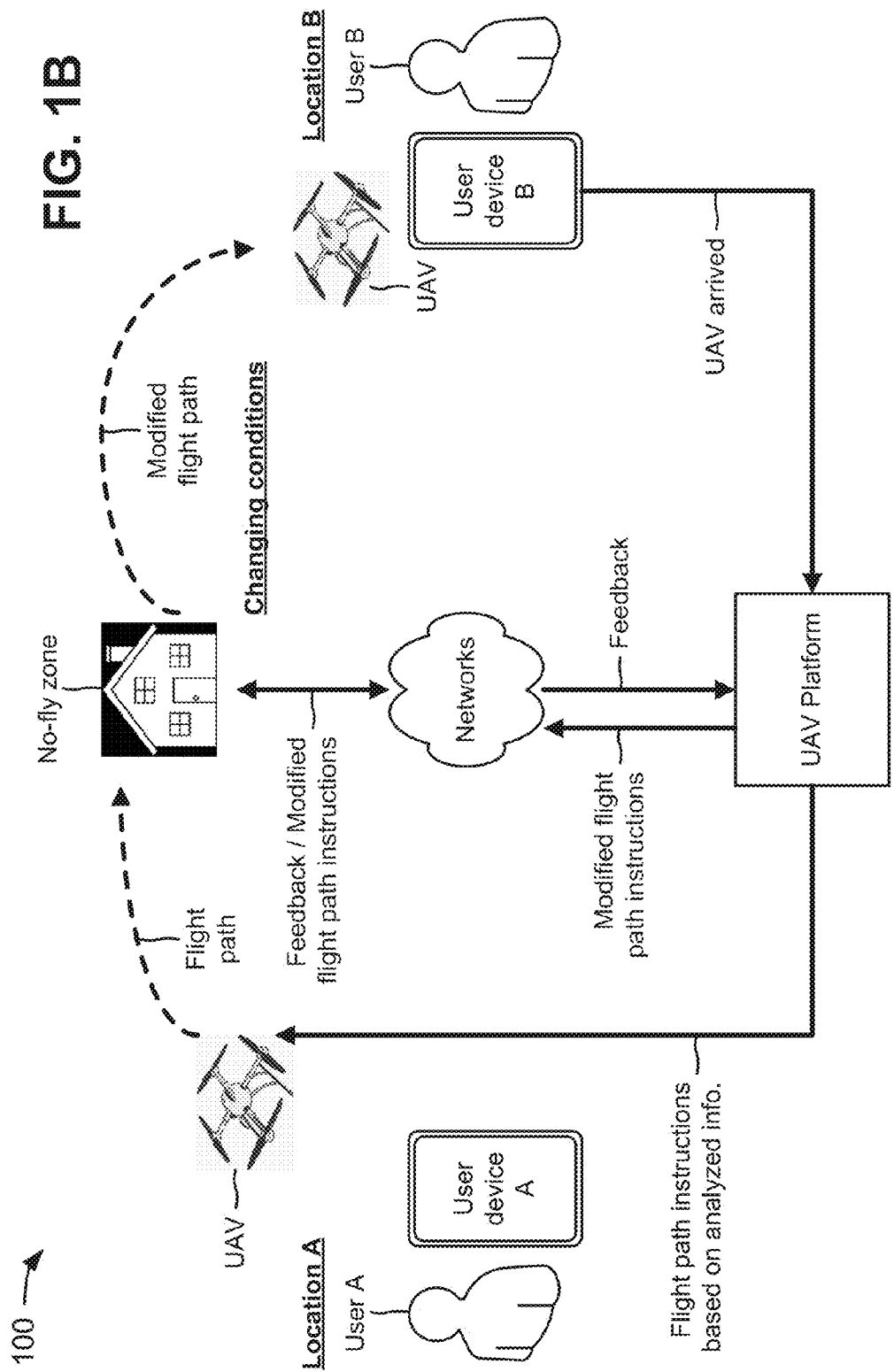

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a package to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide, to the UAV platform, aviation information and shared information associated with aviation in a geographical region (e.g., that includes geographical locations of location A, location B, and locations between location A and location B).

The aviation information may include information associated with aviation in the geographical region, such as capability information associated with UAVs (e.g., thrust, battery life, etc. associated with UAVs); weather information associated with the geographical region (e.g., provided by a national and/or local weather service); air traffic information associated with the geographical region (e.g., provided by a government aviation agency); obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc. The shared information may include aviation information that is received from other sources, such as other UAV platforms, other UAVs, commercial airlines, etc. The shared information may include aviation information associated with the geographical region, such as weather information, air traffic information, obstacle information, regulatory information, etc. that is provided by other UAVs and/or air traffic (e.g., commercial airplanes, private airplanes, etc.) based on actual conditions encountered and/or sensed by the other UAVs and/or air traffic.

As further shown in FIG. 1A, the UAV platform may receive, via the networks, configurability options associated with the shared information, airspace utilized by UAVs associated with the UAV platform, and/or property associated with the UAV platform. The configurability options associated with the shared information may include information indicating how shared information is to be utilized by the UAV platform. The configurability options associated with the airspace may include information indicating whether UAV flight paths are permitted over the airspace. The configurability options associated with the property may include information indicating whether equipment associated with the UAV platform (e.g., cell towers, sensors, recharging stations, etc.) are permitted at the property. The UAV platform may analyze the shared information and/or the aviation information based on the configurability options. For example, the UAV platform may determine whether the shared information and/or the aviation information satisfy the configurability options, and may generate analyzed information that includes portions of the shared information and/or the aviation information that satisfy the configurability options. The UAV platform may provide the analyzed information to data storage.

As further shown in FIG. 1A, user A may instruct user device A (or the UAV) to generate a request for a flight path (e.g., from location A to location B) for the UAV, and to provide the request to the UAV platform. The request may include credentials (e.g., a serial number, an identifier of a universal integrated circuit card (UICC), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. The UAV platform may calculate the flight path from location A to location B based on capability information, associated with the UAV, and/or the analyzed information, and may generate flight path instructions for the flight path. For example, the flight path instructions may indicate that the UAV is to fly at an altitude of two-thousand (2,000) meters, for fifty (50) kilometers and fifty-five (55) minutes, and then is to fly at an altitude of one-thousand (1,000) meters, for seventy (70) kilometers and one (1) hour in order to arrive at location B.

As shown in FIG. 1B, the UAV platform may provide the flight path instructions to the UAV, the UAV may take off from location A, and may travel the flight path based on the flight path instructions. While the UAV is traveling along the flight path, one or more of the networks may receive feedback from the UAV regarding the flight path (e.g., about changing conditions, such as speed, weather conditions, configurability options, etc.). Assume that the UAV identifies changing configurability options (e.g., a no-fly zone over a house) along the flight path, and provides information about the configurability options to the UAV platform (e.g., via the feedback). The UAV platform and/or the UAV may calculate a modified flight path that enables the UAV to avoid the no-fly zone, and may generate modified flight path instructions for the modified flight path. The UAV platform may provide the modified flight path instructions to the UAV. The UAV may travel the modified flight path based on the modified flight path instructions. When the UAV arrives at location B, the UAV and/or user device B may generate a notification indicating that the UAV arrived safely at location B, and may provide the notification to the UAV platform.

Systems and/or methods described herein may provide a platform that enables UAVs to safely traverse flight paths from origination locations to destination locations. The systems and/or methods may enable users of the platform to control configurability options associated with information, airspace, and/or property of the users. The systems and/or methods may enable the users of the platform to be rewarded for sharing some or all of the information, the airspace, and/or the property associated with the users.

Figure 2:
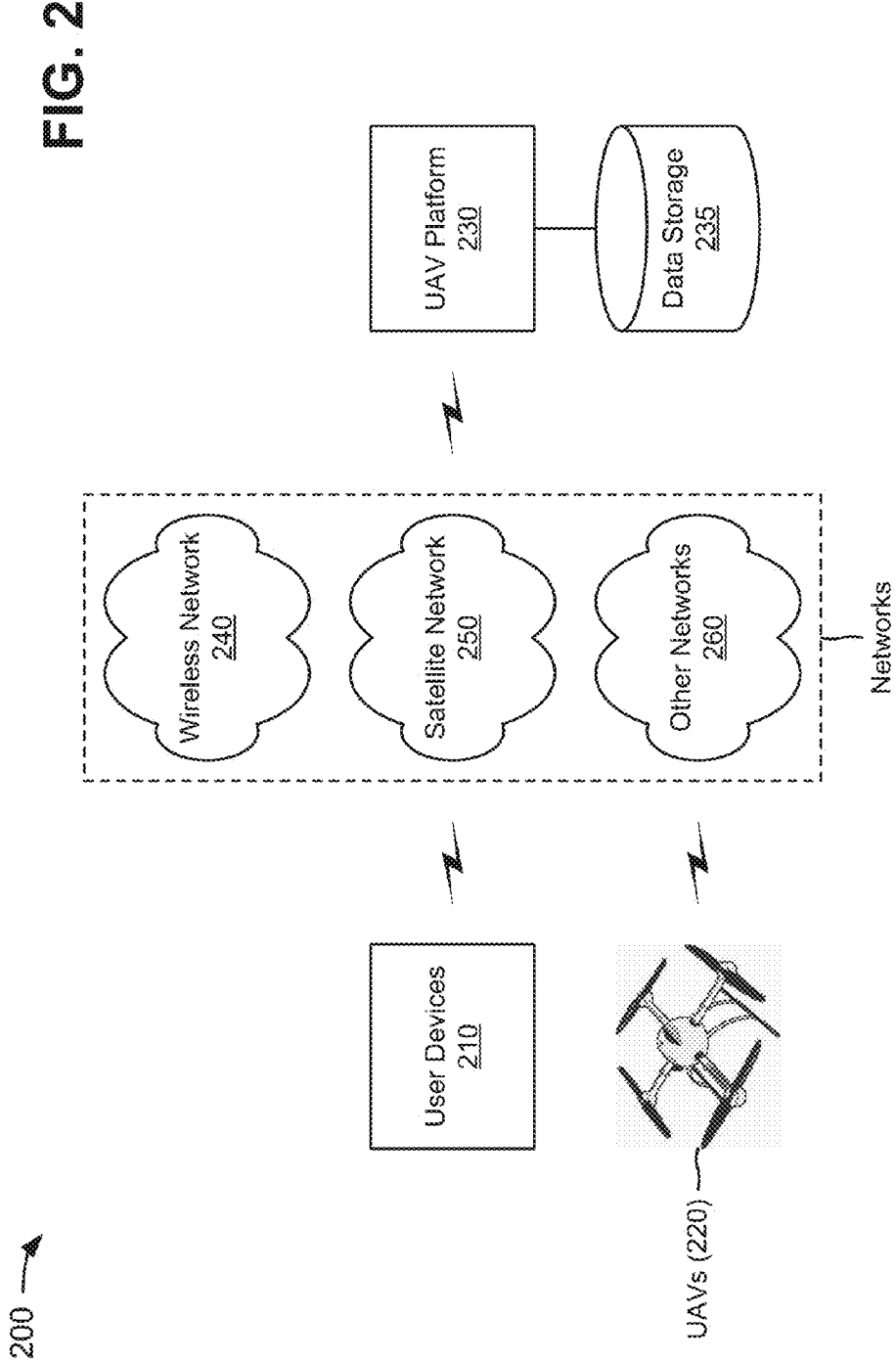
FIG. 2 is a diagram of an example environment in which systems and/or methods described herein may be implemented.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive aviation information, shared information, and/or configurability options, and may analyze the aviation information and the shared information based on the configurability options. UAV platform 230 may store the analyzed information that satisfies the configurability options. UAV platform 230 may receive, from UAV 220, a request for a flight path from an origination location to a destination location, and may determine capability information for UAV 220 based on the request and/or component information associated with UAV 220. UAV platform 230 may calculate the flight path for UAV 220 based on the capability information and/or the analyzed information. UAV platform 230 may generate flight path instructions for the flight path, and may provide the flight path instructions to UAV 220. UAV platform 230 may receive feedback from UAV 220 during traversal of the flight path by UAV 220. UAV platform 230 may modify the flight path instructions based on the feedback, and may provide the modified flight path instructions to UAV 220. UAV platform 230 may receive a notification that UAV 220 arrived at the destination location when UAV 220 lands at the destination location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no-fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
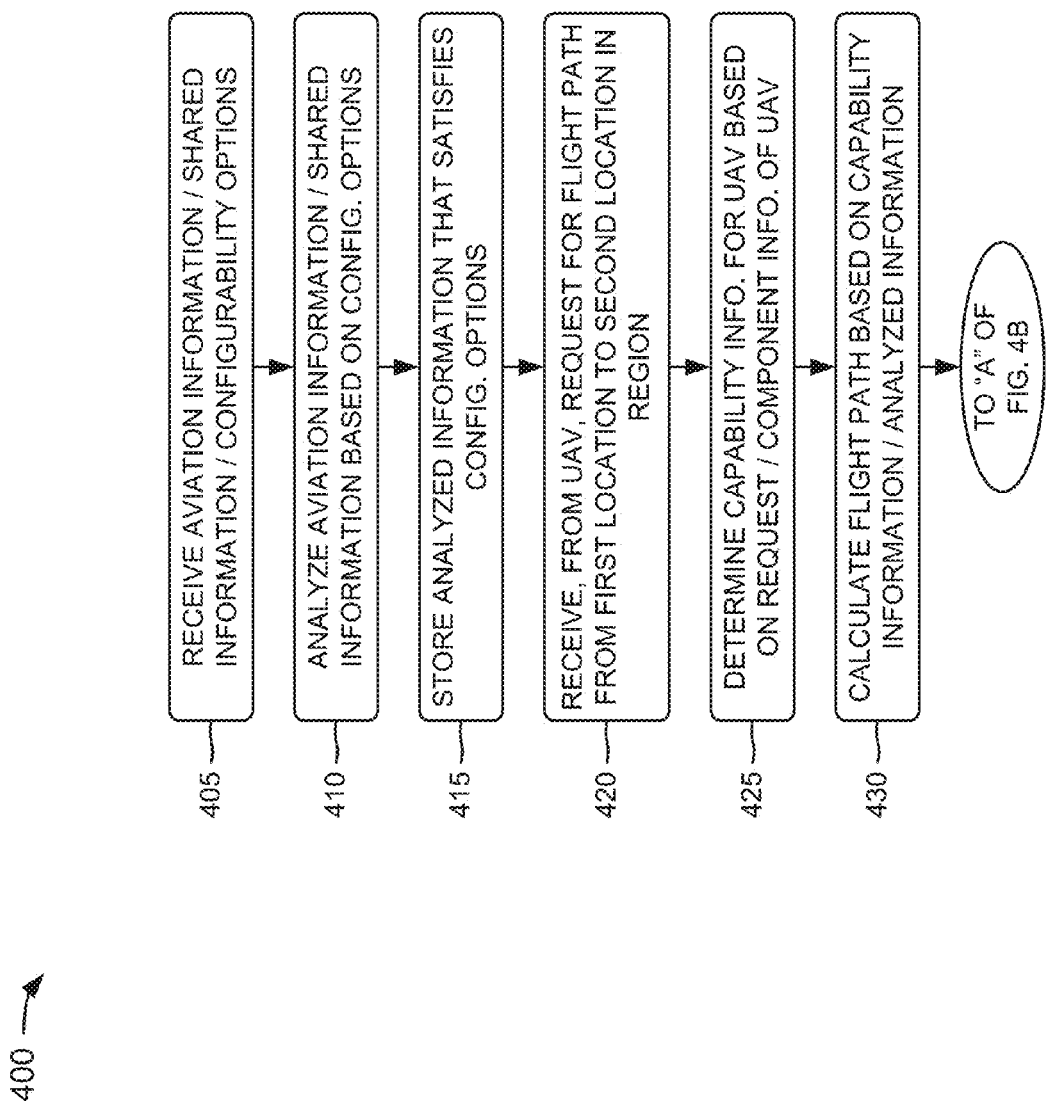
FIGS. 4A and 4B depict a flow chart of an example process for analyzing information based on configurability options, and determining a flight path for a UAV based on the analyzed information.
Figure 4B:
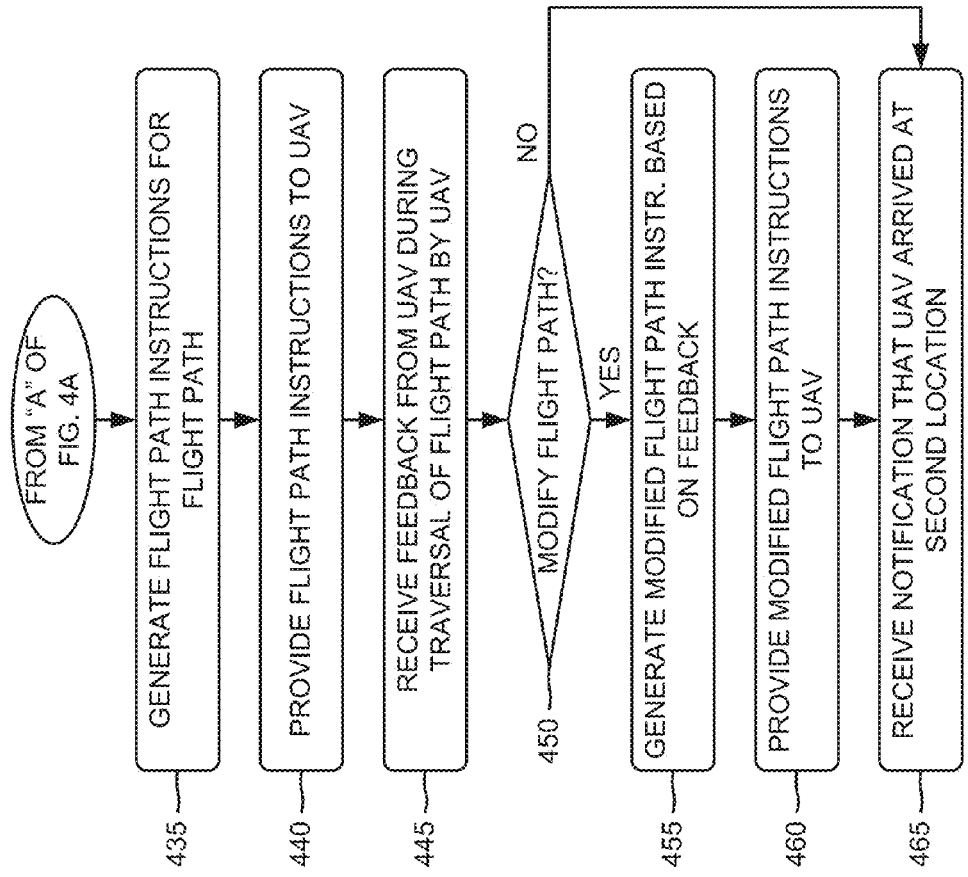

FIGS. 4A and 4B depict a flow chart of an example process 400 for analyzing information based on configurability options, and determining a flight path for a UAV based on the analyzed information. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving aviation information, shared information, and/or configurability options (block 405). For example, UAV platform 230 may receive aviation information, shared information, and/or configurability options (e.g., conditions, attributes, etc.) from one or more of networks 240-260. In some implementations, the aviation information may include information associated with aviation in a geographical region, such as capability information associated with UAVs 220 (e.g., thrust, battery life, etc. associated with UAVs 220); weather information associated with the geographical region; air traffic information associated with the geographical region; obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc.

In some implementations, the other weather information may be provided by a web site (e.g., www.noaa.gov, www.weather.com, etc.) and/or another source that provides information generated by a national weather service, a local weather service (e.g., a web site associated with a local news channel), a satellite network that provides weather information, etc. In some implementations, the other air traffic information may be provided by a web site (e.g., www.faa.gov) and/or another source that provides information generated by a government aviation agency, a satellite network that provides air traffic information, etc. In some implementations, the other obstacle information may be provided by a web site (e.g., www.usgs.gov) and/or another source that provides information generated by a government geological agency, a web site and/or another source that provides a listing of building heights and locations, etc. In some implementations, the other regulatory information may be provided by a web site (e.g., www.faa.gov) and/or another source that provides information generated by a government regulatory agency or a local regulatory agency, a web site and/or another source that provides restricted, prohibited, and/or controlled airspace information, etc. In some implementations, the other historical information may be provided by a web site and/or another source that provides information associated with historical flight paths between geographical locations, historical weather conditions, historical air traffic information, etc.

In some implementations, the shared information may include information associated with aviation in the geographical region, such as weather information, air traffic information, obstacle information, regulatory information, etc. that is provided by other UAVs 220 and/or air traffic (e.g., commercial airplanes, private airplanes, weather balloons, etc.) based on actual conditions encountered and/or sensed by the other UAVs 220 and/or air traffic. For example, the other UAVs 220 and/or air traffic may be equipped with sensors that detect weather information in the geographical region; unforeseen obstacles (e.g., cranes in a construction area, scaffolding in a construction area, a structure of a new high rise building, etc.) in the geographical region; dangerous locations (e.g., where UAVs 220 have been hijacked or damaged) in the geographical region; unexpected air traffic (e.g., private UAVs 220, private airplanes, private balloons, weather balloons, etc.) in the geographical region; etc.

In some implementations, the shared information may include information (e.g., weather information, air traffic information, obstacle information, etc.) that is shared by other sources, such as other UAV platforms, owners and/or operators of UAVs 220 not associated with UAV platform 230, commercial airlines (e.g., that collect information from airplane sensors), etc. For example, the other UAV platforms may provide shared information received from UAVs 220 associated with the other UAV platforms. In another example, UAVs 220 associated with other UAV platforms may be equipped with sensors that detect weather information, unforeseen obstacles, dangerous locations, unexpected air traffic, etc. in the geographical region. In still another example, a commercial airline may manage airplanes equipped with sensors that detect weather information, unforeseen obstacles, dangerous locations, unexpected air traffic, etc. in the geographical region.

In some implementations, the other sources may provide the shared information to UAV platform 230 in exchange for something of value (e.g., money, utilizing information generated by UAV platform 230, priority of using particular airspace, etc.). In some implementations, the other sources may utilize information received and/or generated by UAV platform 230 (e.g., in exchange for the shared information) in order to improve flight paths calculated by the other sources for UAVs 220. In some implementations, the other sources may include trusted owners or operators of UAVs 220 that provide the shared information in order to improve flight paths calculated by UAV platform 230. In some implementations, the other sources may include volunteer operators of UAVs 220 that fly UAVs 220 in order to generate the shared information and provide the shared information to UAV platform 230. In some implementations, UAV platform 230 may provide, to the other sources, a user interface that enables the other sources to provide the shared information to UAV platform 230 and/or to validate information received and/or generated by UAV platform 230. For example, the user interface may enable the other sources to delete or correct inaccurate information received and/or generated by UAV platform 230, validate information received and/or generated by UAV platform 230, etc.

In some implementations, the configurability options may be associated with a source of the aviation information and/or the shared information. The configurability options may enable the source to opt-in or opt-out of providing the aviation information and/or the shared information to UAV platform 230. In some implementations, the configurability options may enable the source to select configuration levels for the aviation information and/or the shared information. In some implementations, the source may share (e.g., via the configurability options) some or all of the aviation information and/or the shared information with UAV platform 230 and users of UAV platform 230. For example, a delivery company with a fleet of UAVs 220 may share some or all of the information, collected by sensors of UAVs 220, with UAV platform 230. In some implementations, the source may share (e.g., via the configurability options) a minimum amount of the aviation information and/or the shared information (e.g., an amount that enables UAV platform 230 to calculate flight paths for UAVs 220 associated with the source). For example, the delivery company may share, with UAV platform 230, capability information associated with the fleet of UAVs 220 but may request that the capability information not be shared with other users of UAV platform 230. In such an example, UAV platform 230 may utilize the capability information to calculate flight paths for the fleet of UAVs 220.

In some implementations, the configurability options may enable the source to limit access to the aviation information and/or the shared information provided to UAV platform 230. For example, UAV platform 230 may store the aviation information and/or the shared information provided by the source, and may limit access to the information (e.g., to particular users of UAV platform 230). In some implementations, the configurability options may enable the source to identify users of UAV platform 230 with which the aviation information and/or the shared information may be shared. For example, a delivery company may, via the configurability options, indicate that the aviation information and/or the shared information is not to be provided to other delivery companies, but may be provided to hospitals associated with UAV platform 230. In such an example, the delivery company may indicate that information associated with a number of UAVs 220 currently in flight is not to be shared with the other delivery companies since the other delivery companies are competitors with the delivery company.

In another example, the police may, via the configurability options, indicate that the aviation information and/or the shared information is not to be shared with users associated with the general public, but may be shared with other law enforcement entities. The police, however, may have the right (e.g., via a warrant or a court order) to see the aviation information and/or the shared information, provided by other sources (e.g., even if the configurability options indicate that the information is not to be shared), if UAVs 220 of the other sources are being utilized for illegal purposes (e.g., illegal drug transportation, stolen goods transportation, invasion of airspace, etc.).

In some implementations, the configurability options may enable the source to select configuration levels for use of the aviation information and/or the shared information. For example, UAV platform 230 may utilize the aviation information and/or the shared information to improve UAV platform 230 (e.g., improve flight paths and/or flight path instructions determined by UAV platform 230), and the configurability options may indicate who may utilize such improvements. In some implementations, the source may enable (e.g., via the configurability options) all users of UAV platform 230 to utilize the improvements to UAV platform 230 that are generated based on the aviation information and/or the shared information. For example, the delivery company with the fleet of UAVs 220 may indicate, via the configurability options, that improvements generated based on information provided by the delivery company may be utilized by all users of UAV platform 230.

In some implementations, the source may enable (e.g., via the configurability options) no users of UAV platform 230 to utilize the improvements to UAV platform 230 that are generated based on the aviation information and/or the shared information. For example, the delivery company may indicate, via the configurability options, that improvements generated based on information provided by the delivery company may only be utilized by the delivery company. In some implementations, the source may enable (e.g., via the configurability options) identified users of UAV platform 230 to utilize the improvements to UAV platform 230 that are generated based on the aviation information and/or the shared information. For example, the delivery company may, via the configurability options, indicate that improvements generated based on information provided by the delivery company are not to be utilized by other delivery companies, but may be utilized by department stores associated with UAV platform 230.

In some implementations, the source may enable users of UAV platform 230 to utilize the improvements to UAV platform 230 in exchange for something of value (e.g., money, utilizing information generated by UAV platform 230, priority of using particular airspace, etc.). In some implementations, the source may utilize information received and/or generated by UAV platform 230 (e.g., in exchange for the improvements) in order to improve flight paths calculated by the source for UAVs 220. In some implementations, UAV platform 230 may provide, to the source, a user interface that enables the source to provide the configurability options to UAV platform 230.

In some implementations, the configurability options may be associated with owners of airspace and/or property (e.g., homeowners, building owners, owners of networks, owners of other UAV platforms, etc.) that may be utilized by UAVs 220 and/or UAV platform 230. In some implementations, the configurability options may enable the owners to opt-in or opt-out of permitting UAVs 220 and/or UAV platform 230 to utilize the airspace and/or the property. For example, an owner of a home may opt-out of permitting UAVs 220 to fly in airspace over the owner's home when air traffic in the airspace is congested. In another example, a company may (e.g., in exchange for money) opt-in to permitting UAVs 220 to fly in airspace over the company's building and/or to permitting a recharging station for UAVs 220 to be installed on the roof of the company's building. In still another example, the company may (e.g., in exchange for money) opt-in to being a location where UAVs 220 may obtain components (e.g., cameras, sensors, etc.), drop off packages (e.g., that may be picked up by a mobile package recipients), etc. In another example, a town or a neighborhood may (e.g., in exchange for money) opt-in to permitting particular UAVs 220 to fly in airspace over the town or neighborhood, which may enable UAV platform 230 to provide an optimized flight path to the particular UAVs 220.

As further shown in FIG. 4A, process 400 may include analyzing the aviation information and/or the shared information based on the configurability options (block 410). For example, UAV platform 230 may analyze the aviation information and/or the shared information based on the configurability options. In some implementations, UAV platform 230 may determine whether the aviation information and/or the shared information include information that violates a configuration option of one or more individuals and/or entities pursuant to the configurability options. In some implementations, UAV platform 230 may not utilize the configuration option violating information when calculating flight paths for UAVs 220. For example, assume that the configurability options identify a no-fly zone over a town, and that the aviation information and/or the shared information include particular information (e.g., weather information, obstacle information, etc.) associated with the no-fly zone. In such an example, UAV platform 230 may not utilize the particular information when calculating flight paths for UAVs 220 since UAV platform 230 may not generate a flight path over the no-fly zone.

In another example, assume that the configurability options indicate that particular information associated with a delivery company (e.g., a number of the delivery company's UAVs 220 that are currently flying) is not to be shared by UAV platform 230 with other users of UAV platform 230. Further, assume that the aviation information and/or the shared information include the particular information associated with the delivery company. In such an example, UAV platform 230 may not share the particular information with other users of UAV platform 230. However, UAV platform 230 may utilize the particular information when calculating flight paths for UAVs 220 since the particular information is pertinent to preventing UAVs 220 from colliding with the delivery company's UAVs 220.

In some implementations, if UAV platform 230 determines that the aviation information and/or the shared information include particular information that satisfies the configurability options, UAV platform 230 may utilize the particular information when calculating flight paths for UAVs 220. For example, assume that the configurability options indicate that particular information associated with an airline (e.g., weather information received from sensors of the airline's airplanes) may be utilized by UAV platform 230 and shared by UAV platform 230 with other users of UAV platform 230. Further, assume that the aviation information and/or the shared information include the particular information associated with the airline. In such an example, UAV platform 230 may determine that the particular information satisfies the configurability options. UAV platform 230 may share the particular information with other users of UAV platform 230, and may utilize the particular information when calculating flight paths for UAVs 220 since the particular information is pertinent to preventing UAVs 220 from colliding with the airline's airplanes.

As further shown in FIG. 4A, process 400 may include storing the analyzed information that satisfies the configurability options (block 415). For example, UAV platform 230 may store the analyzed aviation information and/or shared information, which satisfy the configurability options, in one or more data structures (e.g., tables, lists, databases, etc.) provided in memory (e.g., memory 330 and/or storage component 340, FIG. 3) associated with UAV platform 230. In some implementations, UAV platform 230 may store the analyzed aviation information and/or shared information, which satisfy the configurability options, in one or more data structures provided in data storage 235.

In some implementations, UAV platform 230 may store the analyzed aviation information and/or shared information for general usage. For example, assume that the configurability options indicate that particular information associated with a delivery company (e.g., a number of the delivery company's UAVs 220 that are currently flying) is not to be shared by UAV platform 230 with other users of UAV platform 230. Further, assume that the aviation information and/or the shared information include the particular information associated with the delivery company. In such an example, the particular information may be stored for general usage, such that the delivery company may utilize the particular information but other users of UAV platform 230 may not utilize the particular information.

As further shown in FIG. 4A, process 400 may include receiving, from a UAV, a request for a flight path from a first location to a second location in a particular region (block 420). For example, UAV platform 230 may receive, from UAV 220, a request for a flight path from a first location to a second location in a particular region. In some implementations, user device 210 may provide information associated with the flight path to UAV 220, and UAV 220 may provide the request for the flight path to UAV platform 230. In some implementations, the request for the flight path may be provided by user device 210 to UAV platform 230. In some implementations, the request for the flight path may include a request for flight path instructions from an origination location (e.g., a current location of UAV 220) to a destination location (e.g., a location in the particular region). The origination location and the destination location may be provided in the particular region.

As further shown in FIG. 4A, process 400 may include determining capability information for the UAV based on the request and component information of the UAV (block 420). For example, UAV platform 230 may determine capability information for UAV 220 based on the request for the flight path and component information of UAV 220 (e.g., provided with the request for the flight path). In some implementations, data storage 235 may include capability information associated with different components of UAVs 220, such as battery life, thrusts provided by rotors, flight times associated with amounts of fuel, etc. In some implementations, UAV platform 230 may utilize the component information of UAV 220 (e.g., UAV 220 has a particular type of battery, engine, rotors, etc.) to retrieve the capability information for components of UAV 220 from data storage 235. For example, if UAV 220 has a particular type of battery and a particular type of rotor, UAV platform 230 may determine that the particular type of battery of UAV 220 may provide two hours of flight time and that the particular type of rotor may enable UAV 220 to reach an altitude of one-thousand meters.

In some implementations, UAVs 220 may be required to follow a maintenance schedule (e.g., for safety purposes), and may need to be certified (e.g., by a government agency) that the maintenance schedule is followed. Such information may be provided in data storage 235 (e.g., with the capability information). In some implementations, UAV platform 230 may deny the request for the flight path if UAV platform 230 determines that UAV 220 has not properly followed the maintenance schedule. This may enable UAV platform 230 to ensure that only properly maintained UAVs 220 are permitted to fly, which may increase safety associated with UAVs 220 utilizing airspace.

As further shown in FIG. 4A, process 400 may include calculating the flight path for the UAV based on the capability information and/or the analyzed information (block 430). For example, UAV platform 230 may calculate the flight path from the origination location to the destination location based on the capability information and/or the analyzed information stored in UAV platform 230 and/or data storage 235. In some implementations, UAV platform 230 may determine whether the capability information indicates that UAV 220 may safely complete the flight path from the origination location to the destination location without stopping. If UAV platform 230 determines that UAV 220 cannot safely complete the flight path from the origination location to the destination location without stopping (e.g., to recharge or refuel), UAV platform 230 may determine one or more waypoints along the flight path where UAV 220 may stop and recharge or refuel.

In some implementations, UAV platform 230 may calculate the flight path based on the capability information associated with UAV 220 and the weather information provided by the analyzed information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the capability information associated with UAV 220 and the air traffic information provided by the analyzed information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with other UAVs 220. Alternatively, UAV platform 230 may not alter the flight path, but the other UAVs 220 flying at the altitude of five-hundred meters may increase the possibility that UAV 220 may collide with another UAV 220. UAV platform 230 may then determine whether UAV 220 is capable of safely flying at the altitude of five-hundred meters without colliding with another UAV 220.

Additionally, or alternatively, UAV platform 230 may calculate the flight path based on the capability information associated with UAV 220 and the obstacle information provided by the analyzed information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the capability information associated with UAV 220 and the regulatory information provided by the analyzed information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the capability information associated with UAV 220 and the historical information provided by the analyzed information. For example, UAV platform 230 may identify prior flight paths to the location from the historical information, and may select one of the prior flight paths, as the flight path, based on the capability information associated with UAV 220. For example, assume that UAV platform 230 identifies three prior flight paths that include flight times of two hours, three hours, and four hours, respectively, and may determine that UAV 220 may safely fly for two hours and thirty minutes (e.g., based on the capability information). In such an example, UAV platform 230 may select, as the flight path, the prior flight path with the flight time of two hours.

As shown in FIG. 4B, process 400 may include generating flight path instructions for the flight path (block 435). For example, UAV platform 230 may generate flight path instructions for the flight path. In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers at an altitude of five-hundred meters, fly three-hundred and fifteen degrees northwest for ten kilometers at an altitude of four-hundred meters, etc.

As further shown in FIG. 4B, process 400 may include providing the flight path instructions to the UAV (block 440). For example, UAV platform 230 may provide the flight path instructions to UAV 220. In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4B, process 400 may include receiving feedback from the UAV during traversal of the flight path by the UAV (block 445). For example, while UAV 220 is traveling along the flight path in accordance with the flight path instructions, UAV 220 may provide feedback to UAV platform 230 via one or more of networks 240-260, and UAV platform 230 may receive the feedback. In some implementations, the feedback may include information received by sensors of UAV 220, such as visual information received from electromagnetic spectrum sensors of UAV 220 (e.g., images of obstacles), temperature information, wind conditions, etc. In some implementations, UAV 220 may utilize such feedback to detect and avoid any unexpected obstacles encountered by UAV 220 during traversal of the flight path. For example, if UAV 220 detects another UAV 220 in the flight path, UAV 220 may alter the flight path to avoid colliding with the other UAV 220.

As further shown in FIG. 4B, process 400 may include determining whether to modify the flight path based on the feedback (block 450). For example, UAV platform 230 may determine whether to modify the flight path based on the feedback. In some implementations, UAV platform 230 may determine to not modify the flight path if the feedback indicates that UAV 220 will safely arrive at the destination location. In some implementations, UAV platform 230 may determine to modify the flight path if the feedback indicates that UAV 220 is in danger of colliding with an obstacle (e.g., another UAV 220, a building, an airplane, etc.). In such implementations, UAV platform 230 may modify the flight path so that UAV 220 avoids colliding with the obstacle and/or remains a safe distance from the obstacle.

In some implementations, UAV platform 230 may determine to modify the flight path if the feedback indicates that the weather conditions may prevent UAV 220 from reaching the destination location. For example, the wind conditions may change and cause the flight time of UAV 220 to increase to a point where the battery of UAV 220 will be depleted before UAV 220 reaches the destination location. In such an example, UAV platform 230 may modify the flight path so that UAV 220 either stops to recharge or changes altitude to improve wind conditions. In another example, rain or ice may increase the weight of UAV 220 and/or its payload and may cause the battery of UAV 220 to work harder to a point where the battery of UAV 220 will be depleted before UAV 220 reaches the destination location. In such an example, UAV platform 230 may modify the flight path so that UAV 220 stops to recharge before completing the flight path.

As further shown in FIG. 4B, if the flight path is to be modified (block 450—YES), process 400 may include generating modified flight path instructions based on the feedback (block 455). For example, if UAV platform 230 determines that the flight path is be modified, UAV platform 230 may modify the flight path based on the feedback (e.g., as described above). In some implementations, UAV platform 230 may generate modified flight path instructions for the modified flight path based on the feedback. In some implementations, the modified flight path instructions may modify the flight path instructions based on the feedback. For example, the flight path instructions may be modified so that UAV 220 avoids colliding with an obstacle and/or remains a safe distance from the obstacle, stops to recharge, changes altitude to improve wind conditions, etc.

As further shown in FIG. 4B, process 400 may include providing the modified flight path instructions to the UAV (block 460). For example, UAV platform 230 may provide the modified flight path instructions to UAV 220. In some implementations, UAV 220 may utilize the modified flight path instructions to travel along the modified flight path. For example, UAV 220 may stop and recharge according to the modified flight path instructions, may adjust a route and/or altitudes according to the modified flight path instructions, may detect and avoid any obstacles encountered in the modified flight path, etc. until UAV 220 arrives at the destination location. In some implementations, the feedback may continue to be provided to UAV platform 230 during traversal of the modified flight path by UAV 220, and UAV platform 230 may or may not further modify the flight path based on the further feedback.

As further shown in FIG. 4B, if the flight path is not to be modified (block 450—NO), process 400 may include receiving a notification that the UAV arrived at the second location (block 465). For example, if the feedback and/or the updated real time information indicate that UAV 220 will safely arrive at the destination location, UAV platform 230 may determine that the flight path need not be modified. In some implementations, UAV 220 may continue along the flight path based on the flight path instructions until UAV 220 arrives at the destination location. When UAV 220 arrives at the destination location, UAV 220 may provide a notification to UAV platform 230, via one or more of networks 240-260. In some implementations, the notification may indicate that UAV 220 has safely arrived at the destination location.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5C:
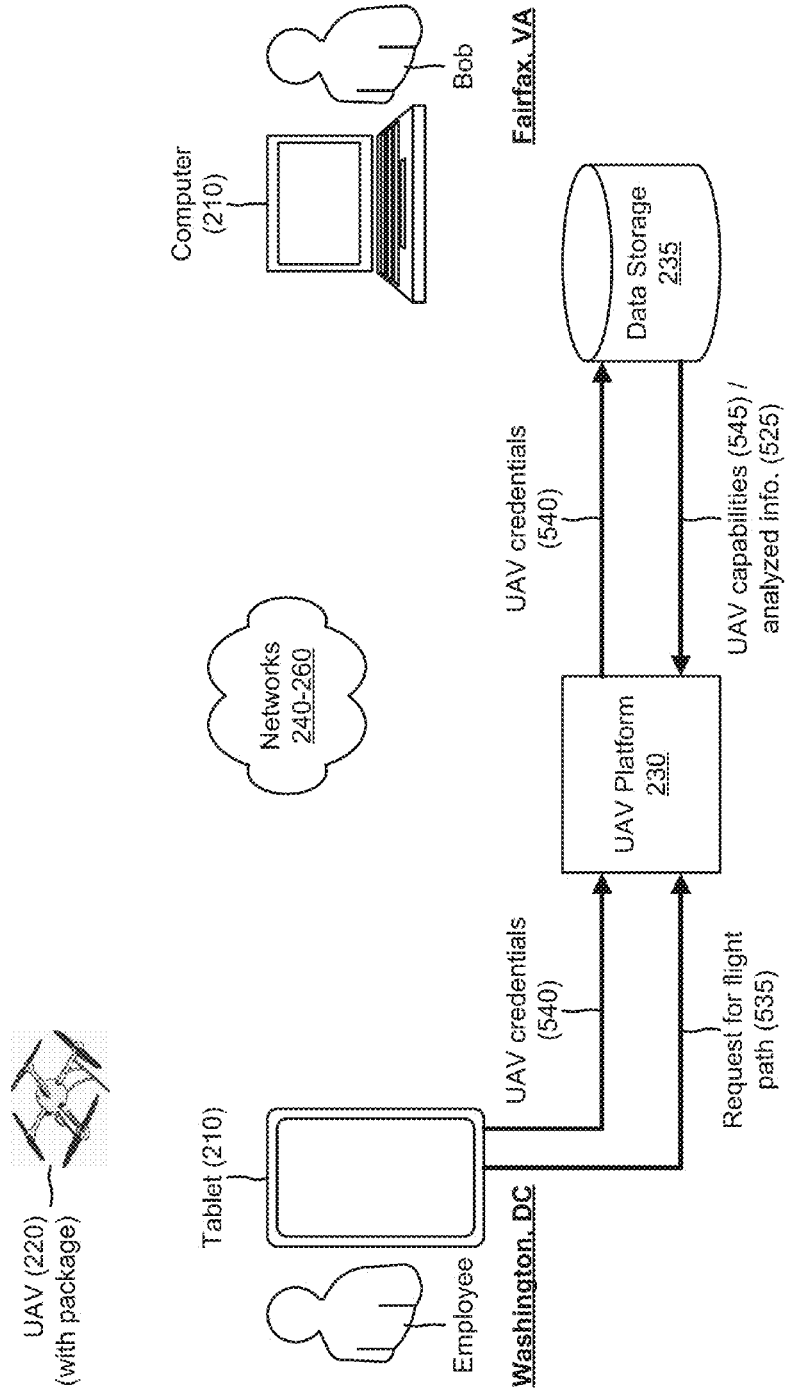

FIGS. 5A-5E are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., a hospital in Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to utilize UAV 220 to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. Wireless network 240, satellite network 250, and/or other networks 260 may receive configurability options 505 from owners of airspace and/or property to be utilized by UAV platform 230 for flights paths of UAVs 220. Networks 240-260 may receive, from other UAVs 220 and/or air traffic, configurability options 510 associated with shared information 515 provided by the other UAVs 220 and/or air traffic. Shared information 515 may include aviation information associated with a geographical region (e.g., that includes a geographical location of Washington, D.C., a geographical location of Fairfax, Va., and geographical locations between Washington and Fairfax), such as shared weather information, shared air traffic information, shared obstacle information, shared regulatory information, etc. associated with the geographical region. Networks 240-260 may receive aviation information 520, such as capability information associated with UAV 220, weather information, air traffic information, obstacle information, regulatory information, historical information, etc. associated with the geographical location. Networks 240-260 may provide configurability options 505/510 and information 515/520 to UAV platform 230, as further shown in FIG. 5A.

UAV platform 230 may receive configurability options 505/510, shared information 515, and aviation information

520, and may analyze shared information 515 and aviation information 520 based on configurability options 505/510. For example, UAV platform 230 may identify portions of shared information 515 and/or aviation information 520 that satisfy configurability options 505/510, and may identify portions of shared information 515 and/or aviation information 520 that violate configurability options. UAV platform 230 may provide the portions of the analyzed shared information 515 and/or aviation information 520 that satisfy configurability options 505/510 to data storage 235, as indicated by reference number 525.

As shown in FIG. 5B, in some implementations, UAV platform 230 may generate a user interface 530 that enables UAV platform 230 to receive configurability options 505/510 from one or more of networks 240-260. UAV platform 230 may provide user interface 530 to user devices 210 associated with the other UAVs 220 and/or air traffic, and to user devices 210 associated with the owners of the airspace and/or the property to be utilized by UAV platform 230 for flights paths of UAVs 220. User interface 530 may include a section that enables owners and/or generators of shared information 515 and/or aviation information 520 to specify configurability options associated with sharing shared information 515 and/or aviation information 520. For example, the owners/generators of shared information 515 and/or aviation information 520 may elect to share all of shared information 515 and/or aviation information 520 with all other users of UAV platform 230. Alternatively, the owners/generators may elect to share all of shared information 515 and/or aviation information 520 with particular users specified by the owners/generators. Alternatively, the owners/generators may elect to share particular portions of shared information 515 and/or aviation information 520 with all other users of UAV platform 230. Alternatively, the owners/generators may elect to share a minimum amount of shared information 515 and/or aviation information 520 with all other users of UAV platform 230. For example, the owners/generators may share, with UAV platform 230, capability information associated with a fleet of UAVs 220, but may request that the capability information not be shared with other users of UAV platform 230. In such an example, UAV platform 230 may utilize the capability information to calculate flight paths for the fleet of UAVs 220.

As further shown in FIG. 5B, user interface 530 may include a section that enables the owners/generators of shared information 515 and/or aviation information 520 to specify configurability options associated with utilizing shared information 515 and/or aviation information 520. For example, the owners/generators may permit UAV platform 230 to utilize all of shared information 515 and/or aviation information 520 to improve UAV platform 230 for all other users of UAV platform 230. Alternatively, the owners/generators may permit UAV platform 230 to utilize particular portions of shared information 515 and/or aviation information 520 to improve UAV platform 230 for all other users of UAV platform 230. Alternatively, the owners/generators may permit UAV platform 230 to utilize all of shared information 515 and/or aviation information 520 to improve UAV platform 230 for particular users specified by the owners/generators. Alternatively, the owners/generators may permit UAV platform 230 to utilize particular portions of shared information 515 and/or aviation information 520 to improve UAV platform 230 for particular users specified by the owners/generators.

As further shown in FIG. 5B, user interface 530 may include a section that enables the owners of the airspace and/or the property to specify configurability options associated with utilizing the airspace and/or the property by UAV platform 230. For example, an owner of airspace may not permit UAV platform 230 to provide flights paths for UAVs 220 in the airspace (e.g., no access to airspace). Alternatively, an owner of airspace may permit UAV platform 230 with limited access to the airspace by, for example, permitting UAV platform 230 to provide a particular number of flight paths in the airspace, permitting UAVs 220 to utilize the airspace but without utilizing cameras, etc. Alternatively, an owner of airspace may permit UAV platform 230 to provide flights paths for UAVs 220 in the airspace (e.g., total access to airspace). In another example, an owner of property may permit an operator of UAV platform 230 to install platform equipment (e.g., recharging stations, network resources, etc.) on the property. Alternatively, an owner of property may not permit an operator of UAV platform 230 to install platform equipment on the property.

As shown in FIG. 5C, the employee may instruct tablet 210 (or UAV 220) to generate a request 535 for a flight path (e.g., from Washington, D.C. to Fairfax, Va.) for UAV 220, and to provide request 535 to UAV platform 230. Request 535 may include credentials 540 (e.g., a serial number, an identifier of a UICC, etc. of UAV 220) associated with UAV 220, or credentials 540 may be provided separately from request 535 to UAV platform 230. UAV platform 230 may utilize credentials 540 to determine whether UAV 220 is authenticated for utilizing UAV platform 230 and/or one or more of networks 240-260, and is registered with an appropriate authority for use. For example, UAV platform 230 may compare credentials 540 with information provided in data storage 235 in order to determine whether UAV 220 is authenticated for utilizing UAV platform 230 and/or one or more of networks 240-260, and is registered with an appropriate authority, as further shown in FIG. 5C.

Assume that UAV platform 230 determines that UAV 220 is authenticated for utilizing UAV platform 230 and/or one or more of networks 240-260, and is registered with an appropriate authority. As further shown in FIG. 5C, when UAV platform 230 determines that UAV 220 is authenticated, UAV platform 230 may retrieve capability information 545 associated with UAV 220 and analyzed information 525 from data storage 235 based on request 535 and/or component information of UAV 220 (e.g., provided with request 535).

Figure 5D:
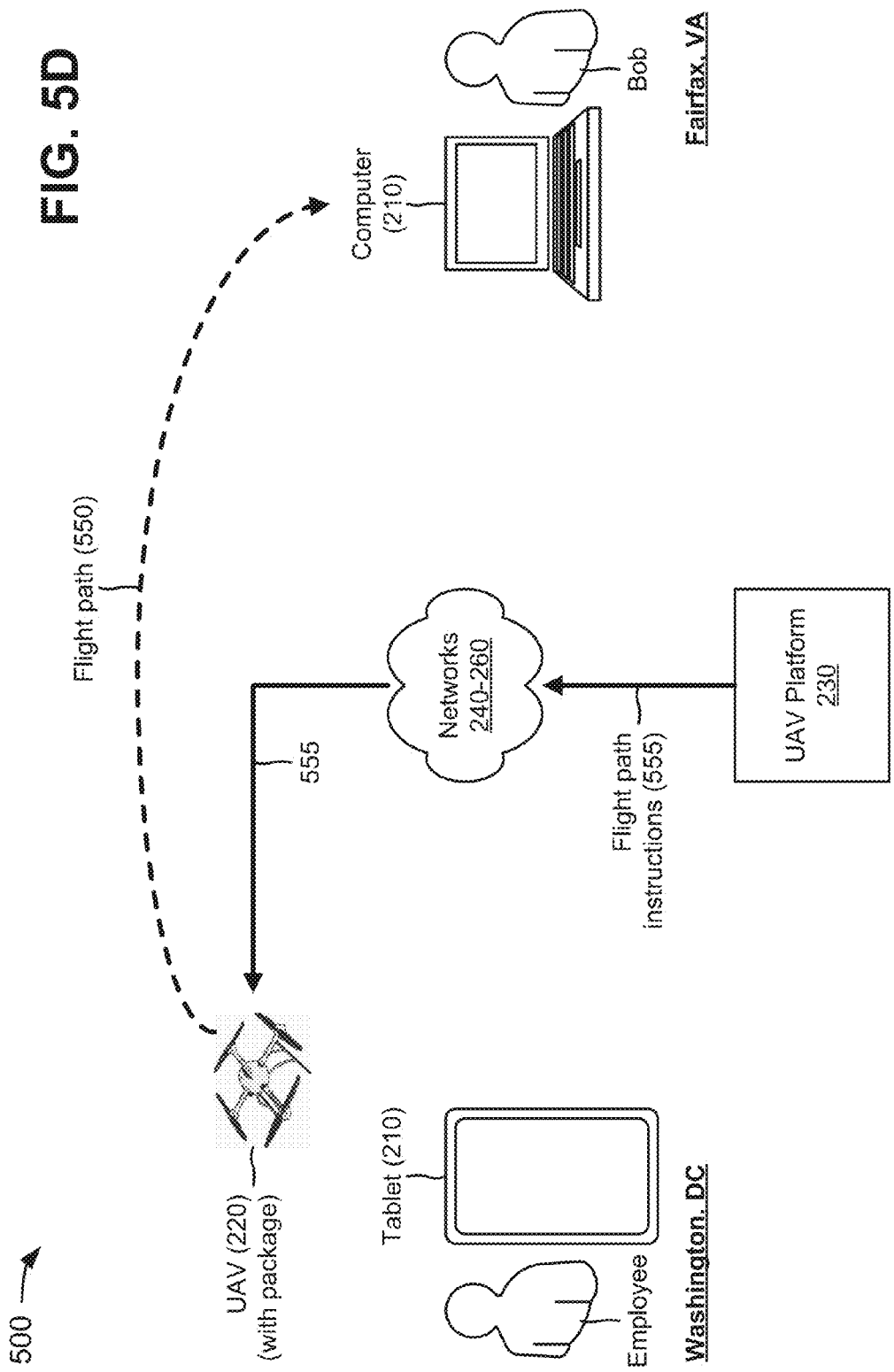

As shown in FIG. 5D, UAV platform 230 may calculate a flight path 550 from Washington, D.C. to Fairfax, Va. based on analyzed information 525 and/or capability information 545. UAV platform 230 may generate flight path instructions 555 for flight path 550, and may provide flight path instructions 555 to UAV 220 via one or more of networks 240-260. Flight path instructions 555 may include information instructing UAV 220 to fly north at zero degrees for ten kilometers, fly northeast at forty degrees for three kilometers, at an altitude of one-thousand meters, etc. UAV 220 may take off from Washington, D.C., and may travel flight path 550 based on flight path instructions 555.

While UAV 220 is traveling along flight path 550, one or more of networks 240-260 may receive feedback 560 from UAV 220 regarding traversal of flight path 550 by UAV 220 (e.g., changing conditions, such as speed, weather conditions, duration, etc.), as shown in FIG. 5E. Networks 240-260 may provide feedback 560 to UAV platform 230. Assume that feedback 560 includes information indicating a no-fly zone (e.g., over a neighborhood) along flight path 550. UAV platform 230 and/or UAV 220 may calculate a modified flight path 565 that enables UAV 220 to avoid the no-fly zone.

As further shown in FIG. 5E, UAV platform 230 and/or UAV 220 may generate modified flight path instructions 570 for modified flight path 565. UAV platform 230 may provide modified flight path instructions 570 to UAV 220 (e.g., via one or more of networks 240-260). UAV 220 may travel modified flight path 565, based on modified flight path instructions 570, until UAV 220 arrives at Fairfax, Va. As further shown in FIG. 5E, when UAV 220 arrives at Fairfax, Va., UAV 220 may leave the package at a location where Bob may retrieve the package. UAV 220 and/or computer 210 (e.g., via Bob's input or detection of the presence of UAV 220) may generate a notification 575 indicating that UAV 220 and the package arrived safely at a particular location in Fairfax, Va., and may provide notification 575 to UAV platform 230.

As indicated above, FIGS. 5A-5E are provided merely as an example. Other examples are possible and may differ from what was described with regard to FIGS. 5A-5E.

Systems and/or methods described herein may provide a platform that enables UAVs to safely traverse flight paths from origination locations to destination locations. The systems and/or methods may enable users of the platform to control access associated with information, airspace, and/or property of the users. The systems and/or methods may enable the users of the platform to be rewarded for sharing some or all of the information, the airspace, and/or the property associated with the users.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, aviation information associated with aviation in a geographical region;
receiving, by the device, configurability options associated with the aviation information;
analyzing, by the device, the aviation information based on the configurability options to generate analyzed information,
the configurability options indicating that the aviation information is to be shared with users of the device and is to be utilized to calculate a flight path for an unmanned aerial vehicle;
causing, by the device and based on the configurability options, one or more sources of the aviation information to be monetarily compensated for providing the aviation information;
receiving, by the device, a request for the flight path for the unmanned aerial vehicle to travel from a first geographical location to a second geographical location in the geographical region;
calculating, by the device, the flight path from the first geographical location to the second geographical location based on the analyzed information and capability information associated with the unmanned aerial vehicle;
generating, by the device, flight path instructions for the flight path; and
providing, by the device, the flight path instructions to the unmanned aerial vehicle to permit the unmanned aerial vehicle to travel from the first geographical location to the second geographical location via the flight path.

2. The method of claim 1, where the configurability options include:
configurability options associated with airspace or property utilized by flight paths of unmanned aerial vehicles.

3. The method of claim 1, where analyzing the aviation information comprises:
identifying the aviation information that satisfies the configurability options; and
generating the analyzed information based on the aviation information that satisfies the configurability options.

4. The method of claim 1, where receiving the configurability options comprises:
- generating a user interface that includes:
  - information associated with configurability options for sharing the aviation information with users of the device, and
  - information associated with configurability options for utilizing the aviation information to calculate flight paths for unmanned aerial vehicles; and
- receiving the configurability options associated with the aviation information via the user interface.

5. The method of claim 4, further comprising:
- providing the user interface to a plurality of user devices associated with the aviation information; and
- receiving the configurability options from the user devices, via the user interface.

6. The method of claim 1, further comprising:
- identifying particular aviation information, of the aviation information, that violates the configurability options; and
- excluding the particular aviation information that violates the configurability options from the analyzed information.

7. The method of claim 1, where the flight path relates to delivery of a package.

8. A system, comprising:
- one or more devices to:
  - receive aviation information associated with aviation in a geographical region;
  - receive configurability options associated with the aviation information;
  - analyze the aviation information based on the configurability options to generate analyzed information,
    - the configurability options indicating that the aviation information is to be shared with other users and is to be utilized to calculate a flight path for an unmanned aerial vehicle;
  - cause, based on the configurability options, one or more sources of the aviation information to be monetarily compensated for providing the aviation information;
  - receive a request for the flight path for the unmanned aerial vehicle to travel from a first geographical location to a second geographical location in the geographical region;
  - calculate the flight path from the first geographical location to the second geographical location based on the analyzed information and capability information associated with the unmanned aerial vehicle;
  - generate flight path instructions for the flight path; and
  - provide the flight path instructions to the unmanned aerial vehicle to permit the unmanned aerial vehicle to travel from the first geographical location to the second geographical location via the flight path.

9. The system of claim 8, where the one or more devices are further to:
- receive a change to the configurability options while the unmanned aerial vehicle is traversing the flight path;
- calculate a modified flight path based on the change to the configurability options;
- generate modified flight path instructions for the modified flight path; and
- provide the modified flight path instructions to the unmanned aerial vehicle to permit the unmanned aerial vehicle to travel to the second geographical location via the modified flight path.

10. The system of claim 8, where the configurability options include:
- configurability options associated with airspace or property utilized by flight paths of unmanned aerial vehicles.

11. The system of claim 8, where, when analyzing the aviation information comprises, the one or more devices are to:
- identify the aviation information that satisfies the configurability options; and
- generate the analyzed information based on the aviation information that satisfies the configurability options.

12. The system of claim 8, where, when receiving the configurability options, the one or more devices are to:
- generate a user interface that includes:
  - information associated with configurability options for sharing the aviation information with users of the device, and
  - information associated with configurability options for utilizing the aviation information to calculate flight paths for unmanned aerial vehicles; and
- receive the configurability options associated with the aviation information via the user interface.

13. The system of claim 12, where the one or more devices are further to:
- provide the user interface to a plurality of user devices associated with the aviation information; and
- receive the configurability options from the user devices, via the user interface.

14. The system of claim 8, where the one or more devices are further to:
- identify particular aviation information, of the aviation information, that violates the configurability options; and
- exclude the particular aviation information that violates the configurability options from the analyzed information.

15. A non-transitory computer-readable medium for storing instructions, the instructions comprising:
- one or more instructions that, when executed by one or more processors of a device, cause the one or more processors to:
  - receive aviation information associated with aviation in a geographical region;
  - receive configurability options associated with the aviation information;
  - analyze the aviation information based on the configurability options to generate analyzed information,
    - the configurability options indicating that the aviation information is to be shared with other users and is to be utilized to calculate a flight path for an unmanned aerial vehicle;
  - store the analyzed information;
  - cause, based on the configurability options, one or more sources of the aviation information to be monetarily compensated for providing the aviation information;
  - receive a request for the flight path for the unmanned aerial vehicle to travel from a first geographical location to a second geographical location in the geographical region;
  - calculate the flight path from the first geographical location to the second geographical location based on the analyzed information and capability information associated with the unmanned aerial vehicle;
  - generate flight path instructions for the flight path; and
  - provide the flight path instructions to the unmanned aerial vehicle to permit the unmanned aerial vehicle to travel from the first geographical location to the second geographical location via the flight path.

16. The non-transitory computer-readable medium of claim 15, where the instructions further comprise:
one or more instructions that, when executed by the one or more processors, cause the one or more processors to:
receive a change to the configurability options while the unmanned aerial vehicle is traversing the flight path;
calculate a modified flight path based on the change to the configurability options;
generate modified flight path instructions for the modified flight path; and
provide the modified flight path instructions to the unmanned aerial vehicle to permit the unmanned aerial vehicle to travel to the second geographical location via the modified flight path.

17. The non-transitory computer-readable medium of claim 15, where the configurability options include:
configurability options associated with airspace or property utilized for flight paths of unmanned aerial vehicles.

18. The non-transitory computer-readable medium of claim 15, where the instructions to analyze the aviation information comprise:
one or more instructions that, when executed by the one or more processors, cause the one or more processors to:
identify the aviation information that satisfies the configurability options; and
generate the analyzed information based on the aviation information that satisfies the configurability options.

19. The non-transitory computer-readable medium of claim 18, where the instructions to receive the configurability options comprise:
one or more instructions that, when executed by the one or more processors, cause the one or more processors to:
generate a user interface that includes:
information associated with configurability options for sharing the aviation information with users of the device, and
information associated with configurability options for utilizing the aviation information to calculate flight paths for unmanned aerial vehicles; and
receive the configurability options associated with the aviation information via the user interface.

20. The non-transitory computer-readable medium of claim 15, where the instructions further comprise:
one or more instructions that, when executed by the one or more processors, cause the one or more processors to:
identify particular aviation information, of the aviation information, that violates the configurability options; and
exclude the particular aviation information that violates the configurability options from the analyzed information.

\* \* \* \* \*